US008756779B2

(12) United States Patent
Condliff et al.

(10) Patent No.: US 8,756,779 B2
(45) Date of Patent: Jun. 24, 2014

(54) TOOL FOR ATTACHING A STUD TO A SURFACE

(75) Inventors: Christopher David Condliff, San Diego, CA (US); James Sullivan Bowlen, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 464 days.

(21) Appl. No.: 13/044,862

(22) Filed: Mar. 10, 2011

(65) Prior Publication Data

US 2012/0227244 A1 Sep. 13, 2012

(51) Int. Cl.
*B23P 11/00* (2006.01)

(52) U.S. Cl.
USPC .......... 29/243.56

(58) Field of Classification Search
USPC ............ 29/243.56, 243.57, 243.58, 238, 239, 29/509; 411/511; 428/139, 99, 922, 40
See application file for complete search history.

(56) References Cited

U.S. PATENT DOCUMENTS

| | | | | |
|---|---|---|---|---|
| 4,668,546 | A | 5/1987 | Hutter, III | |
| 4,778,702 | A | 10/1988 | Hutter, III | |
| 4,822,656 | A | 4/1989 | Hutter, III | |
| 4,842,912 | A | 6/1989 | Hutter, III | |
| 7,413,790 | B2 * | 8/2008 | Hutter, III | 428/139 |
| 7,584,582 | B1 | 9/2009 | Hutter, III | |

OTHER PUBLICATIONS

Click Bond Product Guide. Jul. 15, 2009.

* cited by examiner

*Primary Examiner* — John C Hong
(74) *Attorney, Agent, or Firm* — Snell & Wilmer L.L.P.

(57) ABSTRACT

A tool for applying a fastener, such as a stud, is disclosed herein. In one embodiment, the tool applies the fastener assembled with an applicator. The applicator has at least two legs. The tool includes a housing portion configured to releasably receive the fastener and the applicator. The tool further includes an actuating portion slidingly connected to the housing portion and having one or more projections. Movement of the actuating portion towards the contact surface presses the fastener against the contact surface and bends the at least two legs of the applicator towards the contact surface.

21 Claims, 8 Drawing Sheets

TOOL FOR ATTACHING A STUD TO A SURFACE

CROSS-REFERENCE TO RELATED APPLICATIONS

This application is related to U.S. patent application Ser. No. 13/044,880, entitled "SYSTEM AND METHOD FOR ATTACHING A STUD TO A SURFACE," and filed on the same date as the present application and hereby incorporated by reference in its entirety.

BACKGROUND

1. Field

The invention generally relates to systems and methods for attaching a stud to a surface.

2. Description of the Related Art

In order to attach various items, such as thermal blankets and control cables to the non-airflow surface of the inner fixed surface (IFS) of a thrust reverser, threaded studs can be bonded to the surface using an epoxy adhesive.

SUMMARY

The systems, methods, and apparatuses of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one of ordinary skill in the art will appreciate how the features of this invention provide for attachment of a fastener, such as a stud, to a surface.

One aspect is a tool for attaching a fastener to a contact surface. The tool includes a housing portion configured to releasably receive the fastener and an applicator. The applicator has at least two legs. The tool further includes an actuating portion slidingly connected to the housing portion and comprising one or more projections. Movement of the actuating portion towards the contact surface presses the fastener against the contact surface and bends the at least two legs of the applicator towards the contact surface.

Another aspect is a tool for attaching a fastener to a contact surface using an applicator. The fastener has a base and a shaft. The applicator has at least two legs and means to releasably receive the shaft of the fastener. The tool includes a housing portion having a bearing surface and a receptacle. The bearing surface is configured to contact at least a portion of the applicator. The receptacle is configured to releasably receive a portion of the fastener shaft. The tool further includes an actuating portion slidingly connected to the housing portion. The actuating portion has at least one projection configured to contact and bend the at least two legs of the applicator towards the contact surface. The housing portion is configured to press the base of the fastener against the contact surface.

Another aspect is a method for attaching a fastener to a surface. The method includes providing a tool, the tool having a housing portion and an actuating portion slidingly connected to the housing portion. The method further includes assembling an applicator and a fastener with the housing portion, the applicator having a body, a lower surface, a receptacle, and at least two legs extending from the body, at least a portion of the fastener being disposed within the receptacle. The method further includes contacting the fastener with a surface, the lower surface of the applicator being in contact the fastener. The method further includes sliding the actuating portion with respect to the housing portion, thereby bending the at least two legs of the applicator such that at least a portion of each leg contacts the surface.

Another aspect is an apparatus for attaching a fastener to a contact surface. The apparatus includes a housing portion configured to releasably receive the fastener and an applicator. The applicator has at least two legs. The apparatus further includes an actuating portion slidingly connected to the housing portion. The actuating portion comprises comprising one or more projections constructed and arranged for engagement with the legs of the applicator, such that engagement of the projections with the legs bends the legs towards and into attaching contact with the contact surface and moves the fastener towards and into attaching contact with the contact surface.

Figure 1:
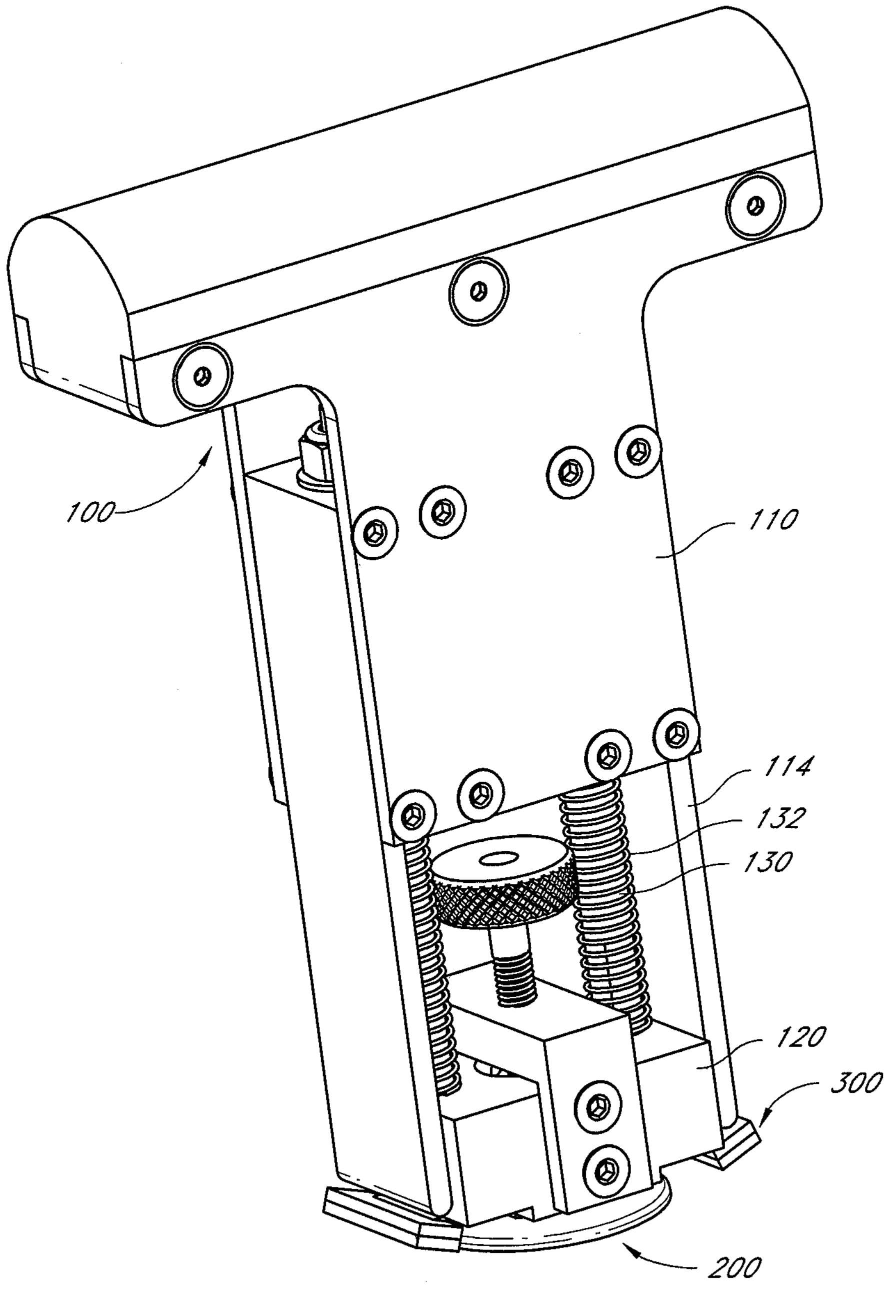
FIG. 1 is a perspective view of a tool according to a preferred embodiment of the present invention engaged with an applicator and a stud.

The various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process. Like reference numerals may be used to denote like features throughout the specification and figures.

DETAILED DESCRIPTION

Various aspects of methods, systems, and apparatuses are described more fully hereinafter with reference to the accompanying drawings. These methods, systems, and apparatuses may, however, be embodied in many different forms and should not be construed as limited to any specific structure or function presented throughout this disclosure. Rather, these aspects are provided so that this disclosure will be thorough and complete, and will fully convey the scope of these methods, systems, and apparatuses to those skilled in the art. Based on the descriptions herein, one skilled in the art should appreciate that the scope of the disclosure is intended to cover any aspect of the methods, systems, and apparatuses disclosed herein, whether implemented independently of or combined with any other aspect of the disclosure. For example, a system or apparatus may be implemented or a method may be practiced using any number of the aspects set forth herein. In addition, the scope of the disclosure is intended to cover such an apparatus, system, or method which is practiced using other structure, functionality, or structure and functionality in addition to or other than the various aspects of the disclosure set forth herein. It should be understood that any aspect of the disclosure herein may be embodied by one or more elements of a claim.

FIG. 1 is a perspective view of a tool 100 for attaching a fastener, such as stud 200, to a contact surface. The tool 100 may be operated by a human operator or be incorporated into and controlled by an automatic stud applying machine or other such robotic type device.

Figure 4:
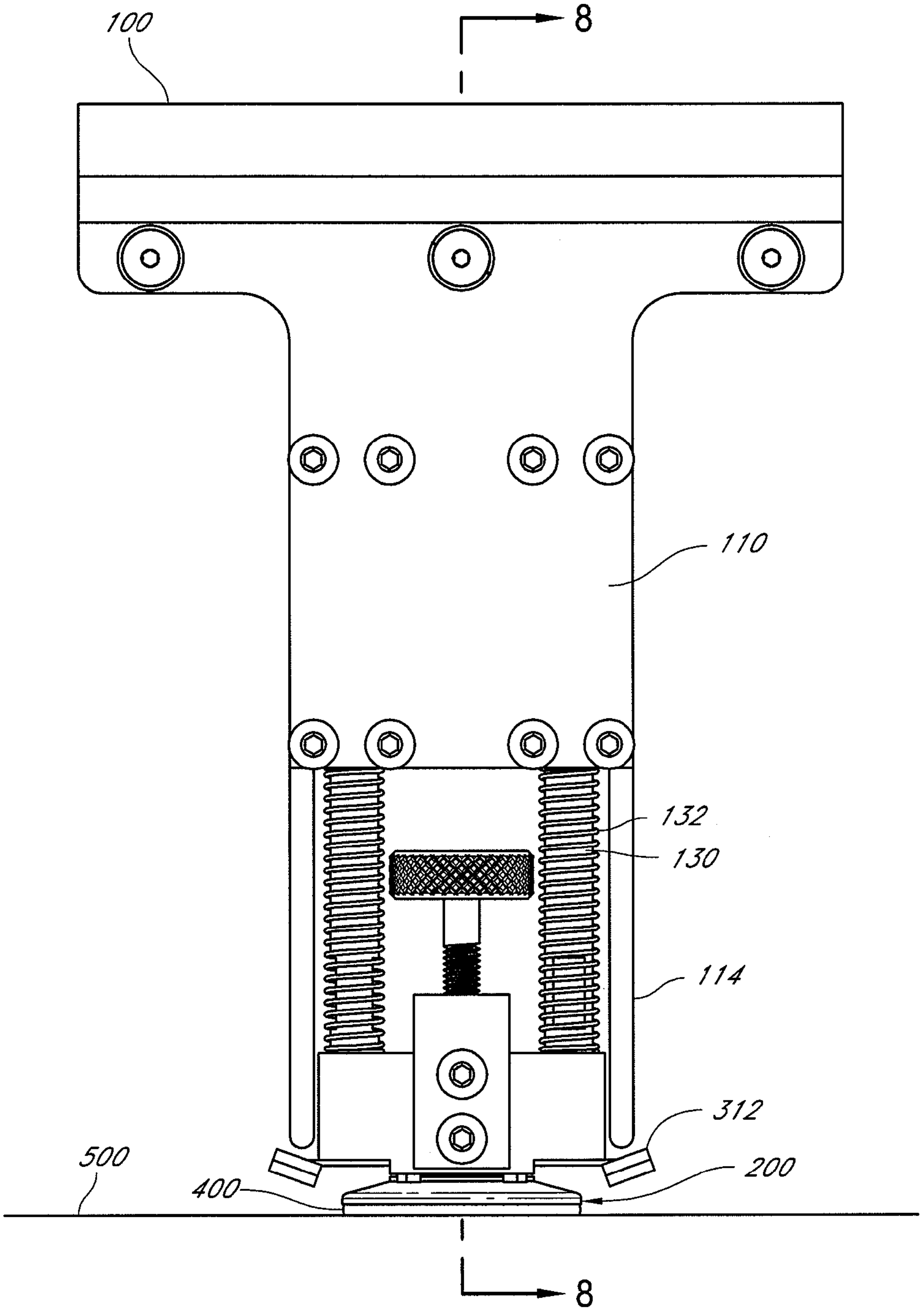
FIG. 4 is a front view of the tool, applicator, and stud from FIG. 1 in a starting position.
Figure 5:
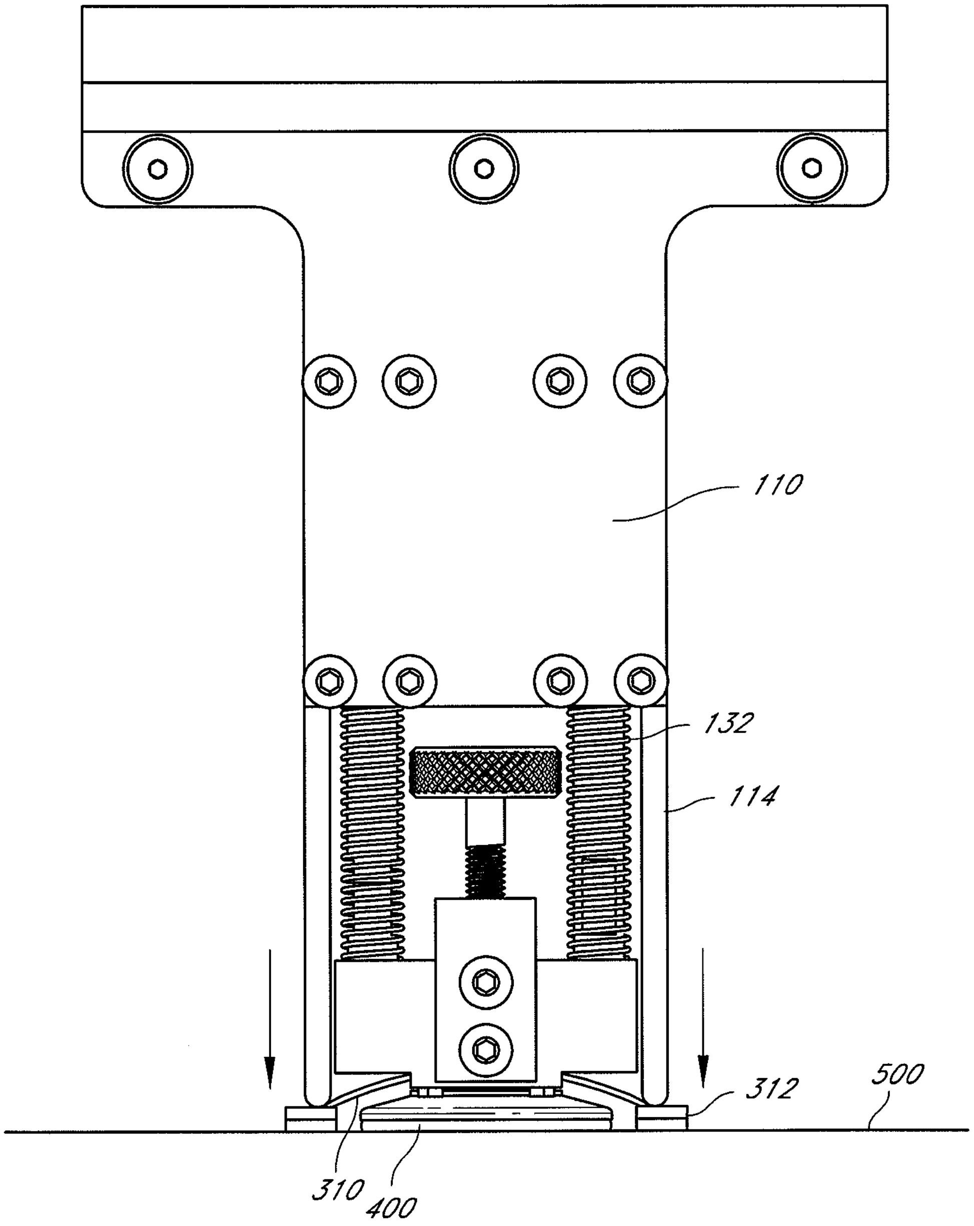
FIG. 5 is a front view of the tool, applicator, and stud from FIG. 1 in an actuated position.
Figure 6:
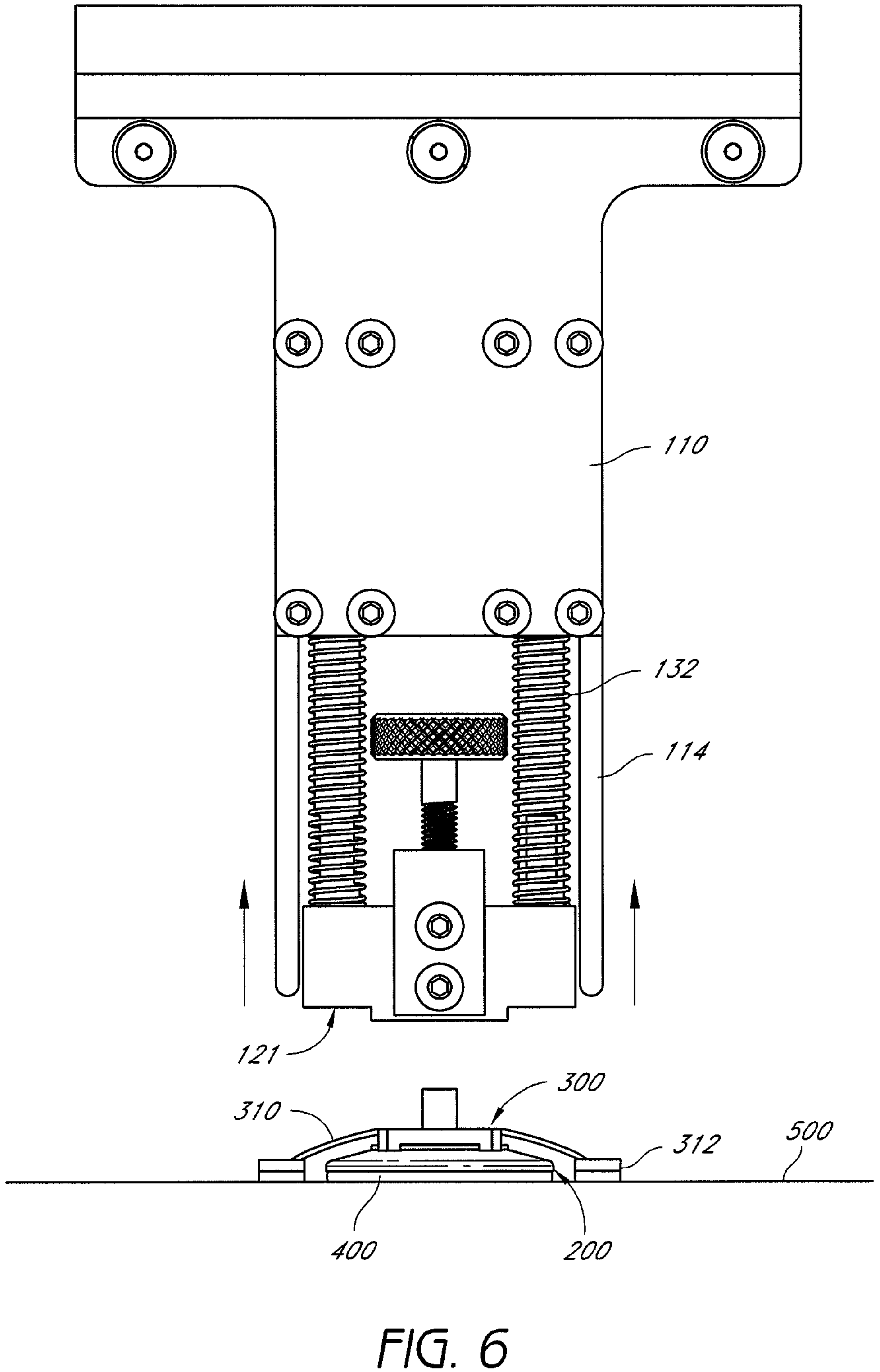
FIG. 6 is a front view of the tool from FIG. 1 in a released position separated from the applicator and stud.

The tool 100 includes an actuating portion 110 and a housing portion 120. The actuating portion 110 is slidably connected to the housing portion 120. In one embodiment, the housing portion 120 is fixedly attached to one or more rods 130 and the housing portion 120 moves vertically along the rods 130, as shown in FIGS. 4-6. The tool 100 may include one or more springs 132 that are compressed when the tool is actuated to provide a restoring force that returns the tool to a released position. In one embodiment, the springs 132 surround the rods 130.

The actuating portion 110 includes means for applying pressure to the anchor feet 312. For example, one or more projections 114 as is illustrated in FIG. 1, a pneumatic cylinder, or other means known to a person having ordinary skill in the art which can apply pressure to the anchor feet 312. In the illustrated embodiment, the projections 114 are movable in the vertical direction. As described below with respect to FIGS. 4-6, when the tool is actuated, the one or more projections 114 move downward with respect to the housing portion 120 and apply a downward force to the anchor feet 312 of the applicator 300, thereby bending the legs 310 of the applicator 300 towards and into contact with the contact surface 500. The projection 114 can be a single projection which contacts both anchor feet 312. For example, the projection 114 may have a rectangular cross-sectional shape which circumscribes the outer perimeter of the tool. The rectangular shaped projection 114 would contact both anchor feet 312 when moved in the downward direction. Alternatively, FIG. 1 illustrates an embodiment of the tool 100 that has two projections 114 disposed on opposite sides of the tool 100. In some embodiments, the two projections 114 move independently of each other. For example, the projections 114 may be spring-loaded or otherwise compliant. Such an arrangement provides adequate pressure to adhere the anchor feet 312 when applying the stud 200 and applicator 300 to irregular surfaces having complex curvatures. In another embodiment, the ends of the anchor feet 312 can pivot to further accommodate irregular surfaces.

Figure 2:
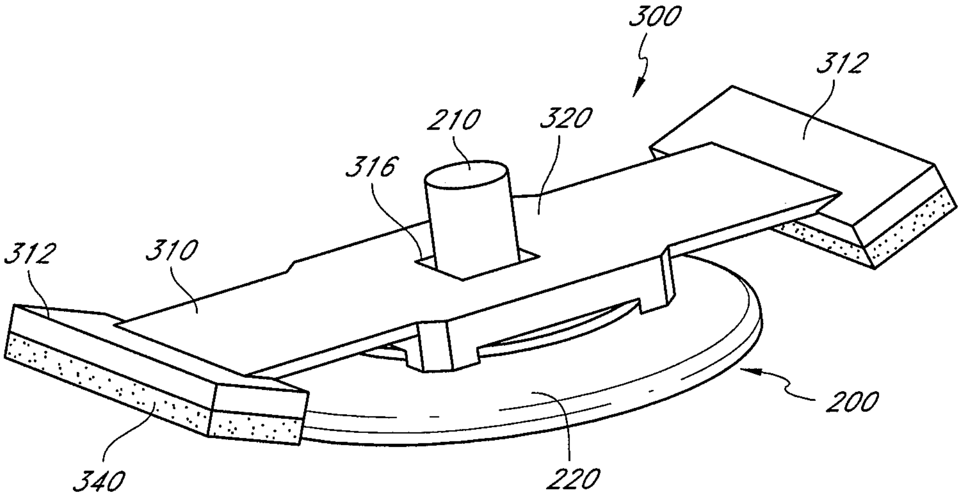
FIG. 2 is a perspective view of the applicator and stud from FIG. 1.
Figure 3:
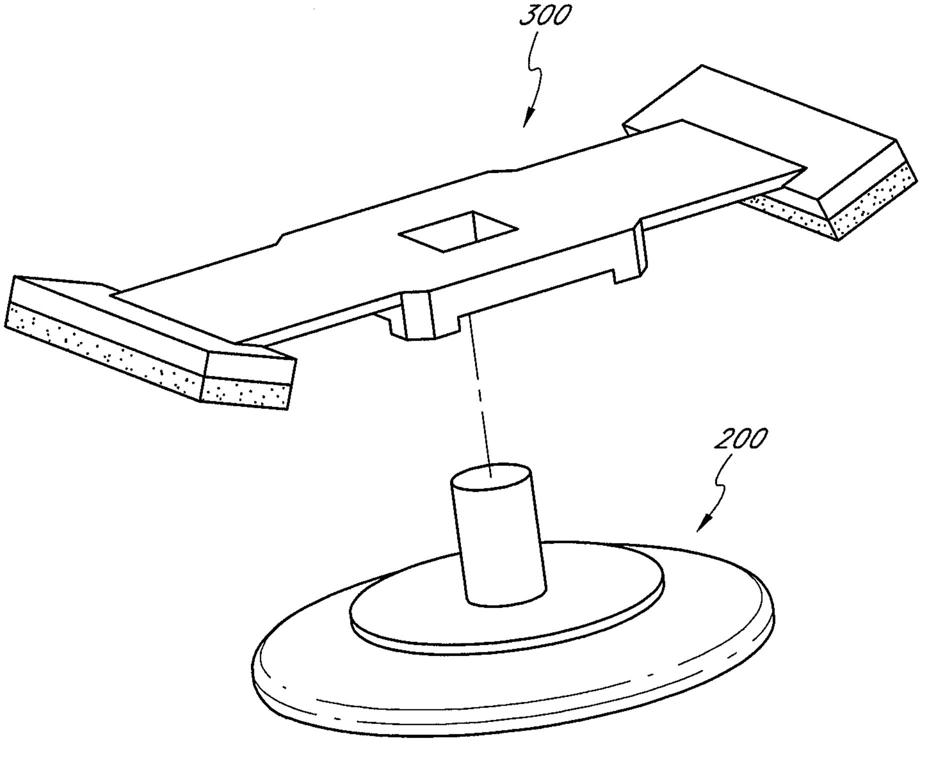
FIG. 3 is a partially exploded perspective view of the applicator and stud from FIG. 2.

The housing portion 120 is configured to house a stud 200 positioned within an applicator 300. FIG. 2 is a perspective view of an exemplary applicator 300 and an exemplary stud 200. FIG. 3 is a partially exploded perspective view of the applicator 300 and stud 200 of FIG. 2. The applicator and stud are described in addition detail in U.S. patent application Ser. No. 13/044,880, incorporated by reference above and hereby incorporated by reference in its entirety.

In one embodiment, the applicator 300 includes a generally planar body having an inner surface 316 defining a receptacle or opening for receiving at least a portion of the stud 200. The applicator includes two or more flexible legs 310 extending away from the body 320. Each leg includes an anchor foot 312 at the end of leg 310. Each anchor foot is preferably angled relative to its respective leg. An adhesive 340 is disposed on each anchor foot 312. In particular, the adhesive 340 covers at least a portion of each anchor foot 312. The adhesive adheres to the contact surface when each anchor foot is in contact with the surface.

In one embodiment, the stud 200 includes a base 220 and a shaft 210 extending from the base 220. At least a portion of the shaft 210 may be threaded. The base 220 of the stud 200 may be a composite material.

The tool 100 is configured to, when actuated, bend each of the legs 310 of the applicator 300 to bring the adhesive 340 disposed thereon in contact with the contact surface. The tool 100 is further configured to release the stud 200 and the applicator 300 when the legs 310 of the applicator 300 are thereby attached to the contact surface, as described below with respect to FIGS. 4-6.

Although the embodiment illustrated in FIG. 1 includes two rods 130, in other embodiments, the tool may include more or fewer rods. Further, in some embodiments, the springs 132 are not coaxially located around the rods 130, but positioned elsewhere. For example, in one embodiment, the tool 100 may include a single spring 132 located between the rods 130. Although the springs 132 are illustrated as compression coils, different biasing devices and other means for applying pressure can be used in other embodiments. For example, in one embodiment, the tool 100 may include tension/extension springs which are stretched when the tool is actuated to provide a restoring force that returns the tool to a released position. The springs 132 can include coil springs, as illustrated, or any mechanical device capable of storing energy. For example, the springs 132 may include a pneumatic cylinder.

FIG. 4 is a front view of the tool 100, applicator 300, and stud 200 in a starting position. An adhesive 400 is present on a lower surface of the stud 200, having been applied either prior to, or subsequent to, the stud and applicator being inserted into the housing portion 120. In one embodiment, the adhesive 400 covers a ring shaped portion of the base of the stud 200. In other embodiments, the adhesive 400 covers the center region of the base of the stud 200. In one embodiment, the adhesive 400 is an epoxy. After the stud 200 is pressed against the contact surface 500 and the adhesive cures, the adhesive 400 secures the stud 200 to the surface 500. In comparison to the adhesive 340 disposed on each anchor foot 312 of the applicator 300, the adhesive 400 beneath the stud may have a longer curing time but a greater bonding strength. For example the adhesive 340 disposed on each anchor foot 312 may be high-strength bonding tape or double-side tape and the adhesive 400 beneath the stud may be an epoxy adhesive.

After the stud 200 and applicator 300 are positioned within the tool as discussed above, the tool 100 is positioned to attach the stud 200 to the contact surface 500. In the starting position illustrated in FIG. 4, the projections 114 are vertically aligned over the anchor feet 312 of the applicator 300. A downward force is applied to the actuating portion 110 which slides the actuating portion 110 downward along the rods 130, compressing the springs 132. As part of the actuating portion 110, the projections 114 also move downward and apply a downward force to the anchor feet 312 of the applicator 300, thereby bending the legs 310 of the applicator 300 toward and into contact with the contact surface 500, as illustrated in FIG. 5.

FIG. 5 is a front view of the tool 100 in an actuated position. In the actuated position illustrated in FIG. 5, projections 114 of the actuating portion 110 apply a downward force bending the legs 310 of the applicator 300 such that the anchor feet 312 contact the contact surface 500. The adhesive 340 disposed on each anchor foot 312 adheres to the contact surface 500. The springs and adhesive(s) are selected such that when the tool is actuated, the projections 114 bend the legs 310 and thereby firmly press the anchor feet 312 and stud 200 into contact with the contact surface 500, but without expelling all of the adhesive 400 from between the feet 312, stud 200 and surface 500. The adhesive 340 on the anchor feet 312 may or may not be the same adhesive 400 as is disposed on the base 220 of the stud 200. Preferably, the adhesive 300 on the feet 312 has sufficient tackiness such that shortly after it contacts with the surface 500, each foot 312 is rigidly adhered to the surface, at which time the projections are released and stud 200 and applicator 300 are released from the tool 100, as illustrated in FIG. 6.

FIG. 6 is a front view of the tool 100 in a released position. In the released position illustrated in FIG. 6, the stud 200 and applicator 300 are detached from the tool 100 and attached to the contact surface 500. As noted above, when the adhesive 400 beneath the stud cures, the adhesive 400 secures the stud 200 in place allowing the applicator 300 to be removed without disturbing the stud 200.

As most clearly shown in FIG. 6, the actuating portion 110 is forced upward by the springs 132 and returned to the same position as in the starting position of FIG. 4. From the released position, another stud 200 and applicator 300 can be inserted into the housing portion 120 and the process of attaching a stud can be performed again.

Although the contact surface 500 illustrated in FIGS. 4-6 is substantially flat, in other embodiments, the contact surface may be concave or convex. The actuating portion 110 may slide further along the rods 130 when applying the stud 200 to a convex surface than when applying the stud 200 to a flat surface. In other embodiments, the contact surface may be irregular such that the applicator 300, when in contact with the contact surface 500, is partially twisted about its horizontal axis. Accordingly, the applicator 300 may be formed of a material flexible enough to at least partially twist about the horizontal axis without breaking.

Figure 7:
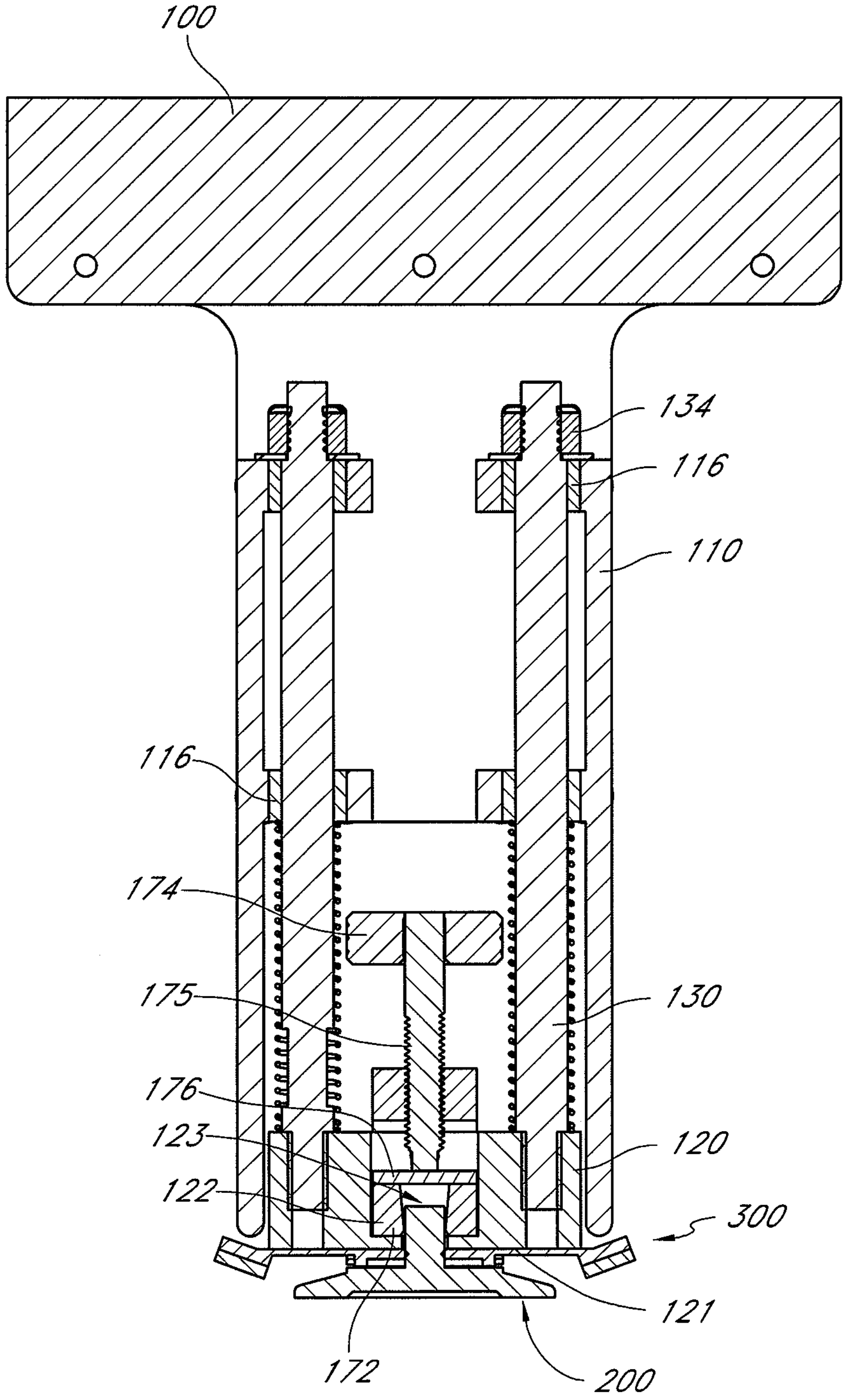
FIG. 7 is a cross-sectional front view of the tool, applicator, and stud from FIG. 1 in the starting position.

FIG. 7 is a front cross-sectional view of the tool 100, applicator 300, and stud 200 in the starting position. As can be seen in FIG. 7, the housing portion 120 is connected to the rods 130. Correspondingly, the actuating portion 110 includes inner surfaces 116 which define openings through which the rods 130 pass. Each rod 130 is fitted with a stop 134 which prevents the actuating portion 110 from separating from the rods 130. Although FIG. 7 illustrates gaps between the inner surfaces 116 and the rods 130, it is to be appreciated that embodiments may not include such gaps, or that such gaps may be quite small.

In FIG. 7, the stud 200 and applicator 300 are inserted into the housing portion 120 of the tool 100. In particular, the shaft 210 of the stud 200 is positioned within a receptacle 123 of the housing portion 120 such that a bearing surface 121 of the housing portion contacts the applicator 300.

The housing portion 120 includes a gripper 122 which grips at least a portion of the stud 200. In one embodiment, the gripper 122 includes a compressible ring 172 that surrounds the receptacle 123. An inner surface of the ring 172 contacts the stud 200. The inner surface may or may not be parallel to the gripped portion of the stud 200. In the illustrated embodiment the inner surface of the compressible ring 172 has a frusto-conical shape. When a thumbscrew 174 is turned, a screw 175 moves in the vertically downward direction, pushing a plate 176 and a ring 172 in the vertically downward direction until the ring 172 contacts and grips the shaft 210 of the stud 200 within a receptacle 123, thereby holding the stud 200 in place. When the thumbscrew 174 is turned in the opposite direction, the screw 175, plate 176, and gripping ring 172 move in the vertically upward direction until the ring 172 is detached from the shaft 210 of the stud 200. In another embodiment, the gripper is an inner surface which provides sufficient friction to grip the shaft 210 when the tool is in the released position, but insufficient friction to grip the shaft 210 when the applicator 300 is adhered to the contact surface 500. In another embodiment, the gripper is an electromagnet that is controlled by an automatic stud applying machine.

Figure 8:
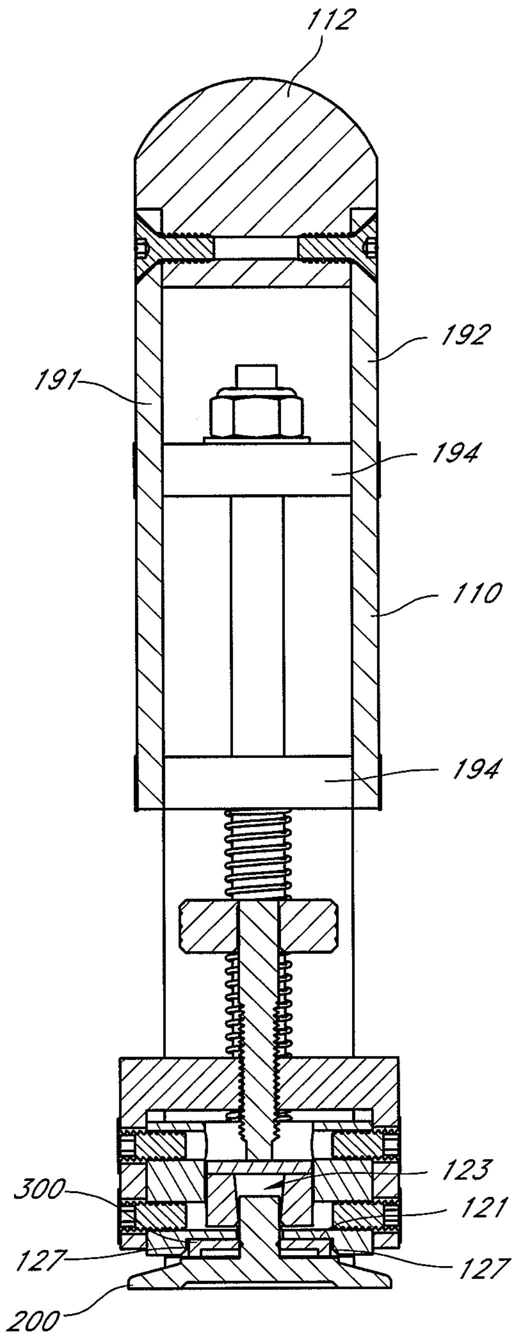
FIG. 8 is a cross-sectional side view of the tool, applicator, and stud from FIG. 1 in the starting position.

FIG. 8 is a cross-sectional side view of the tool, applicator, and stud from FIG. 1 in the starting position. As can be seen in FIG. 8, in one embodiment, the actuating portion 110 includes a front plate 191 and a back plate 192 supporting a handle 112. Supports 194 connect the front plate 191 to the back plate 192.

As described above, the stud 200 and applicator 300 are inserted into the housing portion 120 of the tool 100. In particular, the shaft 210 of the stud 200 is positioned within a receptacle 123 of the housing portion 120 such that a bearing surface 121 of the housing portion contacts the applicator 300. Similarly, as can be most clearly seen in FIG. 8, the bearing surface 121 and vertical surfaces 127 define a channel which receives at least a portion of the applicator 300. The channel aligns the applicator 300 with the projections 114, such that, when the tool is actuated, the projections 114 apply a downward force to the anchor feet 312 of the applicator 300, as described above.

Figure 9:
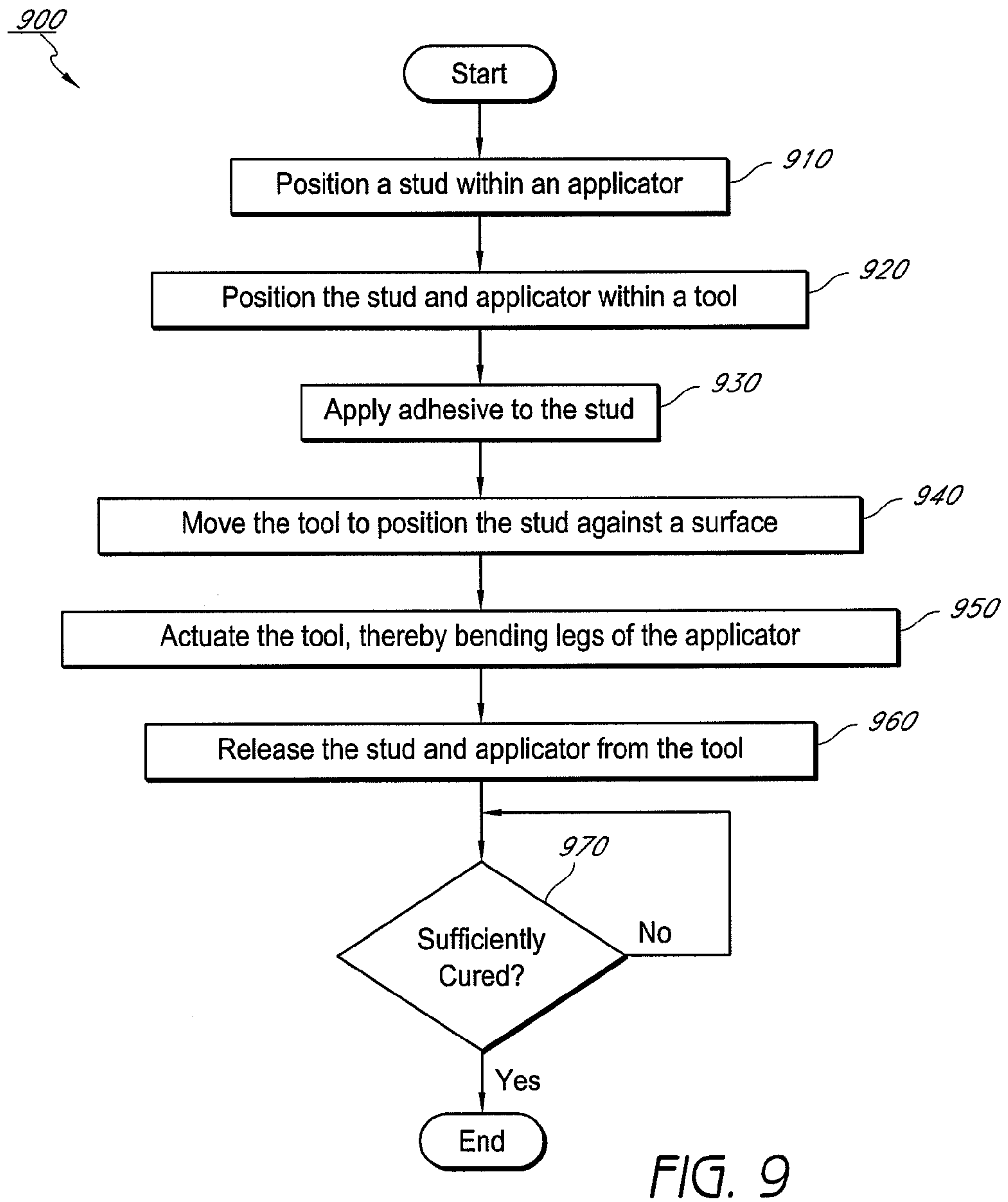
FIG. 9 is a flowchart illustrating a method of applying a stud to a contact surface using the tool from FIG. 1.

FIG. 9 is a flowchart illustrating a method of attaching a stud to a surface. The method can be performed by a human operator, or by an automatic stud applying machine or other such robotic type device. The method 900 begins, in block 910 with at least a portion of a stud being positioned within an applicator. In some embodiments, the stud and applicator may be sold or otherwise packaged together such that the stud is prepositioned within the applicator. In one embodiment, the applicator includes a generally planar body having an inner surface defining a receptacle or opening for receiving at least a portion of the stud. The applicator includes two or more flexible legs extending away from the body. Each leg includes an anchor foot at the end of leg. Each anchor foot is preferably angled relative to its respective leg. An adhesive is disposed on each anchor foot. In particular, the adhesive covers at least a portion of each anchor foot. The adhesive adheres to the contact surface when each anchor foot is in contact with the surface. In one embodiment, the stud includes a base and a shaft extending from the base. At least a portion of the shaft may be threaded.

Next, in block 920, the stud and applicator are positioned within a tool, such as the tool of FIG. 1. As in the tool in FIG. 1, the tool may include a housing portion in which the stud and applicator are positioned and an actuating portion slidably connected to the housing portion. In one embodiment, positioning the stud and applicator within the tool includes actuating a gripper of the tool to retain the stud and application within the tool.

In block 930, adhesive is applied to the stud. In one embodiment, the adhesive is an epoxy and is applied in a ring on the base of the stud. In some embodiments, the adhesive is applied prior to positioning the stud within the tool. Thus, in some embodiments, the step described with respect to block 930 may be performed prior to the step described with respect to block 920. In some embodiments, the adhesive may be sold or otherwise packaged with adhesive pre-applied to the stud. Thus, in some embodiments of the method, the steps described with respect to block 910 and/or 930 may not be performed.

In block 940, the tool is moved such that the stud is positioned against a surface. In some embodiments, the surface is not flat. For example, the surface may be concave or convex, or have a complex curvature. In block 950, the tool is actuated by sliding the actuating portion with respect to the housing portion, thereby bending two or more legs of the applicator towards the surface until an adhesive layer on the legs contacts the surface.

In block 960, the stud and applicator are released from the tool. In one embodiment, the stud and applicator may be released by deactuating a gripper of the tool. In another embodiment, the stud and applicator may be released simply by removing the tool, leaving the stud and applicator attached to the surface.

The method 900 pauses in block 970 until the applied adhesive is sufficiently cured. In block 980, the applicator is removed, leaving the stud bonded to the surface by the cured adhesive. The method 900 can be repeated, by returning to block 910, for attaching additional studs to the surface.

Figure 10:
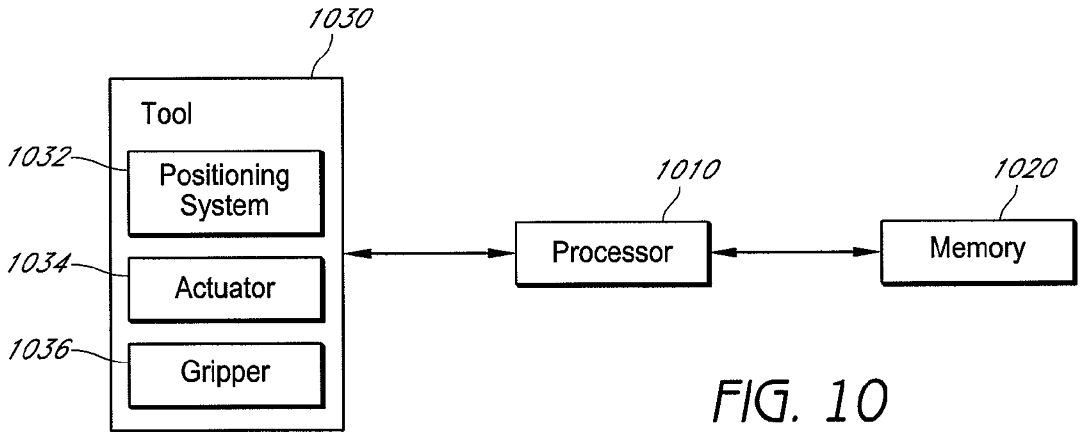
FIG. 10 is a functional block diagram of an automatic stud applying machine according to a preferred embodiment of the present invention.

As mentioned above, the tool can be incorporated into and controlled by an automatic stud applying machine. FIG. 10 is a functional block diagram of an automatic stud applying machine 1000. The automatic stud applying machine 1000 includes a processor 1010 in data communication with a memory 1020, and a tool 1030. In controlling the tool 1030, the processor 1010 may control a positioning system 1032, an actuator 1034, and a gripper 1036.

The processor 1010 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 1010 can be coupled, via one or more buses, to read information from or write information to the memory 1020. The processor may additionally, or in the alternative, contain memory, such as processor registers. The memory 1020 can include processor cache, including a multi-level hierarchical cache in which different levels have different capacities and access speeds. The memory 1020 can also include random access memory (RAM), other volatile storage devices, or non-volatile storage devices. The storage can include storage devices including hard drives, optical discs, such as compact discs (CDs) or digital video discs (DVDs), flash memory, floppy discs, magnetic tape, and Zip drives. The memory 1020 may store processor-executable instructions for operating the tool and for applying studs to a surface.

The processor 1010 is coupled to the tool 1030 and is configured to control operation of the tool 1030. In controlling the tool 1030, the processor may receive information from one or more sensors regarding the state or position of the tool 1030 or portions thereof. The processor 1010 controls the positioning system 1032 to position a stud within the tool or to position the stud against a surface in a predetermined position. The positioning system 1032 may include one or more motors. For example, the positioning system 1032 may include a robotic arm.

The processor 1010 can control the actuator 1034 to move the tool from a starting position to an actuated position and to a released position as described above with respect to FIGS. 4-6. In particular, the processor 1010 can control the actuator 1034 to move a slidably connected portion of the tool 1030 with respect to a fixed portion of the tool 1030. The actuator 1034 may include, for example, a motor or a piston.

The processor 1010 can control the gripper 1036 to grip or release the stud from with the tool 1030. In one embodiment, the gripper 1036 includes a compressible ring as described above with respect to FIG. 7. In one embodiment, the gripper 1036 may include a motor. In another embodiment, the gripper 1036 is an electromagnet or other such electronically controlled gripping device.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. A tool for attaching a fastener to a contact surface, the tool comprising:

a housing portion configured to releasably receive the fastener and an applicator, the applicator having at least two legs; and an actuating portion slidingly connected to the housing portion and comprising two projections, a first projection aligned with a top portion of a first leg and a second projection aligned with a top portion of a second leg, wherein movement of the actuating portion towards the contact surface presses the fastener against the contact surface and bends the at least two legs of the applicator towards the contact surface.

2. The tool of claim 1 further comprising one or more biasing elements, wherein movement of the actuating portion towards the contact surface biases each biasing element.

3. The tool of claim 1 further comprising one or more rods fixedly attached to the housing portion, at least a portion of the rods being disposed in the actuating portion.

4. The tool of claim 3 further comprising one or more stops respectively positioned at ends of the one of the one or more rods and configured to prevent the actuating portion from disconnecting from the housing portion.

5. The tool of claim 1 wherein the housing portion comprises a lower surface defining a channel for receiving at least a portion of the applicator.

6. The tool of claim 1 wherein the housing portion comprises an inner surface defining a receptacle for receiving at least a portion of the fastener.

7. The tool of claim 6 wherein the housing portion comprises a gripper configurable to retain at least a portion of the fastener within the receptacle.

8. The tool of claim 7, further comprising means for attaching and detaching the fastener from the gripper.

9. The tool of claim 1 wherein movement of the actuating portion towards the contact surface causes the housing portion to press the fastener against the contact surface.

10. The tool of claim 1, wherein movement of the actuating portion towards the contact surface causes the two projections to bend the at least two legs of the applicator towards the contact surface.

11. An automatic stud applying machine comprising the tool of claim 1.

12. The machine of claim 11 further comprising at least one motor configured to position the tool with respect to the contact surface and to move the actuating portion towards the contact surface.

13. The machine of claim 12 further comprising at least one motor configured to position the fastener and applicator with respect to the housing.

14. The machine of claim 12 further comprising a processor configured to control the at least one motor.

15. A tool for attaching a fastener to a contact surface using an applicator, the fastener having a base and a shaft, the applicator having at least two legs and means to releasably receive the shaft of the fastener, the tool comprising:

a housing portion having a bearing surface and a receptacle, the bearing surface configured to contact at least a portion of the applicator, the receptacle configured to releasably receive a portion of the fastener shaft; and an actuating portion slidingly connected to the housing portion and having two projections, a first projection configured to contact and bend the a first leg of the applicator towards the contact surface a second projection configured to contact and bend a second leg of the applicator towards the contact surface and the housing portion configured to press the base of the fastener against the contact surface.

16. The tool of claim 15 further comprising one or more springs configured to press the actuating portion towards the contact surface.

17. The tool of claim 15 further comprising one or more rods fixedly attached to the housing portion, at least a portion of the one or more rods disposed in the actuating portion.

18. The tool of claim 15 wherein the housing portion comprises a lower surface defining a channel for receiving at least a portion of the applicator.

19. The tool of claim 15 wherein the housing portion comprises a gripper configurable to retain at least a portion of the fastener within the receptacle.

20. An apparatus for attaching a fastener to a contact surface, the apparatus comprising:

a housing portion configured to releasably receive the fastener and an applicator, the applicator having at least two legs; and an actuating portion slidingly connected to the housing portion and comprising two or more projections constructed and arranged for separate engagement with each of the at least two legs of the applicator, such that engagement of the two projections with the at least two legs bends the at least two legs towards and into attaching contact with the contact surface and moves the fastener towards and into attaching contact with the contact surface.

21. The apparatus of claim 20 further comprising the applicator, wherein the housing portion comprises a lower channel, and wherein at least a portion of the applicator is disposed in the channel at least when the fastener is receive within the housing portion.

* * * * *